United States Patent [19]

Gerken et al.

[11] Patent Number: 4,663,131
[45] Date of Patent: May 5, 1987

[54] PROCESS FOR THE PREPARATION OF TITANIUM DIOXIDE

[75] Inventors: Rudolf Gerken; Gerhard Wiederhöft; Günter Lailach; Walter Gutsche; Wolfgang D. Müller, all of Krefeld, Fed. Rep. of Germany

[73] Assignee: Bayer Aktiengesellschaft, Leverkusen, Fed. Rep. of Germany

[21] Appl. No.: 673,244

[22] Filed: Nov. 20, 1984

[30] Foreign Application Priority Data

Nov. 30, 1983 [DE] Fed. Rep. of Germany ....... 3343256

[51] Int. Cl.⁴ .......................................... C01G 23/047
[52] U.S. Cl. ...................................... 423/82; 75/1 T
[58] Field of Search ........................... 423/82; 75/1 T

[56] References Cited

U.S. PATENT DOCUMENTS

| | | |
|---|---|---|
| 2,112,966 | 4/1938 | Krchma . |
| 2,180,961 | 11/1939 | Kramer ................................. 423/82 |
| 2,774,650 | 12/1956 | Oppegaard ........................... 423/82 |
| 3,533,742 | 10/1970 | Oster ..................................... 423/83 |
| 4,038,363 | 7/1977 | Jarish .................................... 423/82 |
| 4,288,415 | 9/1981 | Rahm et al. .......................... 423/82 |
| 4,313,913 | 2/1982 | Panek et al. .......................... 423/82 |

Primary Examiner—H. T. Carter
Attorney, Agent, or Firm—Sprung Horn Kramer & Woods

[57] ABSTRACT

In the preparation of titanium dioxide comprising autothermically digestion a titanium-containing raw material with sulphuric acid to form a solid relatively easily soluble digestion cake containing titanyl sulphate, extracting metal sulphates from this cake by water or dilute sulphuric acid, separating the undissolved residues and, optionally after crystallization of iron sulphate heptahydrate, hydrolyzing the titanyl sulphate to produce titanium oxide hydrate, and calcining the titanium oxide hydrate to titanium dioxide, the improvement which comprises adding to the raw material a metal sulphate and effecting the autothermic decomposition with sulphuric acid of about 80 to 88% concentration. Advantageously the acid is obtained by mixing dilute acid with concentrated sulphuric acid or oleum, some of the dilute acid and metal sulphate coming from a by-product filter cake produced in the course of the process.

8 Claims, No Drawings

PROCESS FOR THE PREPARATION OF TITANIUM DIOXIDE

The present invention relates to a process for the preparation of titanium dioxide by autothermic digestion of raw materials containing titanium by means of sulphuric acid to form a solid, relatively easily soluble digestion cake, extraction of the metal sulphates from this cake with water or dilute sulphuric acid, removal of the undissolved residues and, optionally after crystallization of iron sulphate heptahydrate, hydrolysis of the titanyl sulphate and calcining of the hydrated titanium oxide to titanium dioxide.

According to the present state of the art (Ullmanns Enzyklopädie 4, Edition 1979, Volume 18, pages 574–576), autothermic digestion of titanium raw materials to produce a solid, relatively easily soluble digestion cake requires the use of sulphuric acid at a concentration of at least 88 to 92% at the beginning of the reaction. This sulphuric acid is normally produced by the addition of water or steam to a mixture of a 90 to 98% sulphuric acid and the ground up $TiO_2$ raw material. The heat produced from mixing water and sulphuric acid is responsible for a sufficiently sharp rise in temperature to start the exothermic reaction of $TiO_2$ raw material with sulphuric acid to form metal sulphates and water. The heat of reaction released raises the temperature of the mixture to 170°–220° C. and causes extensive evaporation of the water originally present and the water formed during the reaction. In order to obtain the digestion cake in a relatively easily soluble, porous state, air is continuously blown through the mass during the reaction if the process of digestion is carried out discontinuously.

In a process of discontinuous digestion, the formation of a solid, gas permeable cake is extremely desirable. If the reaction mass is still in the form of a viscous liquid at a relatively high temperature, bubbles of steam are liable to form in the mass and the sudden release of pressure in these bubbles is liable to take place explosively, with undesirable consequences.

When digestion is carried out as a continuous process in paddle screws or similar apparatus, it is desirable to obtain a friable reaction product which can easily be suspended in the vessel in which the product is dissolved.

If $TiO_2$ production is to be carried out with an awareness of environmental considerations, waste acid, sulphuric acid recovered from the evaporation of waste acid, or relatively dilute sulphuric acid obtained from other sources such as installations for the purification of exhaust gases may usefully be employed for the digestion of the raw material containing $TiO_2$. If 96 to 99% sulphuric acid is mixed with these acids instead of with water, they may only be used in very small quantities, but if oleum is mixed with acids containing less than 75% $H_2SO_4$, considerably larger quantities of dilute acids or acids of medium concentration may be used. It may easily be calculated, however, that one important ecological aim, namely recovery of all the sulphuric acid from the $TiO_2$ waste acid, cannot be achieved by this procedure since it is not practicable to evaporate waste acids to concentrations higher than 65% $H_2SO_4$ (salt free) for reasons of the solubility of iron sulphate. Further evaporation to increase the concentration of the acid to above 65% after separation of the metal sulphate would require considerably greater effort and cost.

It is an object of the present invention to provide a process enabling the decomposition of $TiO_2$ raw materials to be carried out with lower sulphuric acid concentrations at the beginning of the reaction and yet resulting in a solid, gas permeable, readily soluble decomposition cake if the process is carried out batchwise or a solid, friable cake if it is carried out continuously.

It has now surprisingly been found that this object may be achieved if the digestion reaction is carried out in the presence of metal sulphates.

The present invention therefore relates to a process for the preparation of titanium dioxide by autothermic digestion of raw materials containing titanium by means of sulphuric acid to form a solid, relatively easily soluble digestion cake, extraction of the metal sulphates from this cake by solution with water or dilute sulphuric acid, removal of the undissolved residues and possibly of iron sulphate heptahydrate after the latter has been crystallized, hydrolysis of the titanyl sulphate and calcining of the hydrated oxide of titanium to titanium dioxide, characterized in that the reaction mixture contains sulphuric acid at a concentration of 80 to 88% and metal sulphates at the beginning of the digestion reaction. By adjusting the sulphuric acid concentration to only 80 to 88% instead of 88 to 92% at the beginning of the reaction, it is possible to use substantially larger quantities of 20 to 75% sulphuric acid for the digestion of $TiO_2$ raw materials than has hitherto been possible. Moreover, the presence of metal sulphates slows down the reaction at the beginning in the case of batchwise digestion and improves the consistency and solubility in water of the ripened cake.

The quantity of metal sulphates to be introduced is to be determined by preliminary tests for the particular $TiO_2$ raw materials used. Over a wide range, the only factor influenced is the consistency of the digestion cake. The quantity of metal sulphates added is advantageously adjusted to the required sulphuric acid concentration and the particular $TiO_2$ raw materials used. It is only when relatively large quantities of sulphate are used that a substantial reduction in $TiO_2$ yield is observed, probably due to insufficient contact between acid and $TiO_2$ raw material as a result of the dilution effect of the metal sulphates or due to a reduction in the maximum temperature during digestion. The metal sulphate content of the digestion mixture at the beginning of the reaction is generally from 0.5 to 25%, preferably from 2 to 15%.

The 80 to 88% sulphuric acid put into the process may be obtained by mixing 95 to 99% sulphuric acid with 20 to 75% sulphuric acid or, if available, by mixing oleum with 20 to 75% sulphuric acid. This means that the process according to the invention may obviate the use of an oleum plant.

The metal sulphates, in particular iron sulphate, aluminum sulphate and magnesium sulphate, may be dissolved in the 20 to 75% sulphuric acid or suspended in solid form. They may also be introduced into the digestion mixture in the form of solids together with the $TiO_2$ raw material, in which case they may be used either as filter cake obtained from concentration of the waste acid by evaporation or as iron sulphate monohydrate obtained from the dehydration of iron sulphate heptahydrate. Other metal sulphates low in or free from water of hydration may also be used for the purpose of this invention.

The 20 to 75% sulphuric acid used for the purpose of this invention may suitably be so-called $TiO_2$ waste acid or waste acid concentrated by evaporation, containing dissolved metal sulphates. Other 20 to 75% spent acids of inferior quality may also be used.

According to one particularly preferred embodiment of the process of this invention, at least a proportion of the 20 to 75% sulphuric acid and of the metal sulphates is used in the form of the metal sulphate/sulphuric acid suspension obtained from the concentration of $TiO_2$ waste acid by evaporation.

For economical reasons, it is particularly suitable to use metal sulphates obtained as filter cakes from the filtration of the evaporation-concentrated $TiO_2$ waste acid. Iron sulphate monohydrate as obtained from the dehydration of iron sulphate heptahydrate is also advantageous on account of its low water content.

If the reaction mixture contains salt, the digestion reaction may still be started in the usual manner by the injection of steam, the addition of water or the evolution of mixing heat from the acid.

The advantages of the process according to the invention will be demonstrated in the following examples without restricting the scope of the invention as regards the metal sulphates put into the process, the acid concentration or the $TiO_2$ raw materials.

EXAMPLE 1 (Comparison Example)

400 g of ground ilmenite (60.0% $TiO_2$, 9.3% FeO, 25.7% $Fe_2O_3$, 1.25.% $Al_2O_3$, 0.5% MgO) were mixed with 754 of 96% sulphuric acid in a Dewar vessel. The reaction was started by the addition of 68 g of $H_2O$. The calculated sulphuric acid concentration was at this stage 88% $H_2SO_4$. Air was blown through the mixture during the reaction at the rate of 500 l/h. After 12 minutes, the mixture solidified at a temperature of 180° C. The maximum temperature of 202° C. was reached after 13 minutes. After a ripening time of 3 hours, the cake was broken down and dissolved in water. Complete solution of the sulphate took 4 hours. The $TiO_2$ yield was 93.6%.

EXAMPLE 2 (Comparison Example)

400 g of ilmenite were mixed with 754 g of 96% $H_2SO_4$ by a procedure analogous to that of Example 1 but 129 g of $H_2O$ were added so that the starting concentration of $H_2SO_4$ was 82%. The mixture solidified at 173° C. but only after 25 minutes and after it had reached its temperature maximum at 176° C. at the end of a reaction time of 13 minutes. The cake took 5 hours to dissolve. The $TiO_2$ yield was only 93.0%. The late onset of the solidification of the decomposition mass indicates the risk of explosive release of tension in the steam bubbles under industrial conditions of digestion.

EXAMPLE 3

400 g of ilmenite similar to that of Example 1 were mixed with 719.7 g of 96% $H_2SO_4$ and 117.6 g of filter cake obtained from the evaporation of waste acid (27.9% $H_2SO_4$, 28.5% $FeSO_4$, 7.3% $Al_2(SO_4)_3$, 9.4% $MgSO_4$, 5.1% $TiOSO_4$), and 91.3 g of $H_2O$ were added. The sulphuric acid concentration was 84.0% $H_2SO_4$ at the onset of the reaction. The reaction mixture solidified at 168° C. after 9 minutes. The mixture reached its temperature maximum at 196° C. after 11 minutes. After a ripening time of 3 hours, the cake was dissolved in water over a period of 5 hours. The $TiO_2$ yield (based on the quantity of ilmenite put into the process) was 95.4%.

EXAMPLE 4

400 g of the ilmenite were mixed with 467.6 g of sulphuric acid recovered from waste acid evaporation (65% $H_2SO_4$, 4.0% ($MgSO_4+Al_2(SO_4)_3$)) and 117.6 g of the filter cake described in Example 3. The reaction was started by the addition of 369.2 g of 27% oleum. The $H_2SO_4$ concentration was 82.0%. The reaction mixture solidified at 180° C. after 13 minutes. The temperature maximum was reached at the same time.

After a ripening time of 3 hours, the digestion cake was dissolved in water over a period of 3.5 hours. The $TiO_2$ yield (based on ilmenite) was 94.5%.

It will be understood that the specification and examples are illustrative but not limitative of the present invention and that other embodiments within the spirit and scope of the invention will suggest themselves to those skilled in the art.

We claim:

1. In the preparation of titanium dioxide comprising autothermically digesting a titanium-containing raw material with sulphuric acid to form a solid relatively easily soluble digestion cake containing titanyl sulphate, extracting metal sulphates from this cake by water of dilute sulphuric acid, separating the undissolved residues and, optionally after crystallization of iron sulphate heptahydrate, hydrolyzing the titanyl sulphate to produce titanium oxide hydrate, and calcining the titanium oxide hydrate to titanium dioxide, the improvement which comprises adding to the raw material in about 2 to 25% by weight of the raw material a metal sulphate and effecting the autothermic decomposition with sulphuric acid of about 80 to 88% concentration wherein at least a portion of the metal sulphate is added in the form of a solid.

2. The process according to claim 1, wherein the 80 to 88% sulphuric acid is prepared by mixing oleum with 20 to 75% sulphuric acid.

3. The process according to claim 2, wherein the 20 to 75% sulphuric acid is $TiO_2$ waste acid or $TiO_2$ waste acid concentrated by evaporation, and contains metal sulphates in solution.

4. The process according to claim 2, wherein the 20 to 75% sulphuric acid is low grade spent acid.

5. The process according to claim 2, wherein at least a portion of the 20 to 75% sulphuric acid and of the metal sulphates is in the form of a metal sulphate/sulphuric acid suspension obtained from concentration of $TiO_2$ waste acid by evaporation.

6. The process according to claim 2, wherein the 20 to 75% sulphuric acid contains metal sulphates in solution and in solid form.

7. The process according to claim 1, wherein the metal sulphate is used in the form a filter cake obtained from filtration of evaporation-concentrated $TiO_2$ waste acid.

8. The process according to claim 1, wherein the metal sulphate used is iron sulphate monohydrate obtained by the dehydration of iron sulphate heptahydrate.

* * * * *

UNITED STATES PATENT AND TRADEMARK OFFICE
CERTIFICATE OF CORRECTION

PATENT NO. : 4,663,131

DATED : May 5, 1987

INVENTOR(S) : Rudolf Gerken, et al.

It is certified that error appears in the above-identified patent and that said Letters Patent is hereby corrected as shown below:

Col. 3, line 30          After "1.25" delete "."

Col. 3, line 31          After "754" insert --g--

Col. 4, line 27          After "water" delete "of" and substitute --or--

Signed and Sealed this

Twentieth Day of October, 1987

Attest:

DONALD J. QUIGG

Attesting Officer    Commissioner of Patents and Trademarks